US006438556B1

(12) United States Patent
Malik et al.

(10) Patent No.: US 6,438,556 B1
(45) Date of Patent: *Aug. 20, 2002

(54) METHOD AND SYSTEM FOR COMPRESSING DATA WHICH ALLOWS ACCESS TO DATA WITHOUT FULL UNCOMPRESSION

(75) Inventors: Nadeem Malik; Jason Raymond Baumgartner; Steven Leonard Roberts, all of Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/210,503

(22) Filed: Dec. 11, 1998

(51) Int. Cl.⁷ .............................................. G06F 17/30
(52) U.S. Cl. ......................... 707/101; 707/6; 707/100; 386/109; 386/111; 386/112; 348/419.1; 348/384.1
(58) Field of Search ................................ 707/100, 101, 707/6; 348/419.1, 384.1; 386/109, 111, 112, 27, 33

(56) References Cited

U.S. PATENT DOCUMENTS

| | | | | |
|---|---|---|---|---|
| 4,486,784 A | * | 12/1984 | Abraham et al. | 358/261 |
| 5,122,873 A | * | 6/1992 | Golin | 358/133 |
| 5,243,341 A | * | 9/1993 | Seroussi et al. | 341/51 |
| 5,267,165 A | * | 11/1993 | Sirat | 364/419.11 |
| 5,377,051 A | * | 12/1994 | Lane et al. | 360/33.1 |
| 5,410,355 A | * | 4/1995 | Kolczynski | 348/438 |
| 5,455,680 A | * | 10/1995 | Shin | 358/426 |
| 5,481,312 A | * | 1/1996 | Cash et al. | 348/466 |
| 5,572,209 A | * | 11/1996 | Farmer et al. | 341/67 |
| 5,668,352 A | * | 9/1997 | Christian et al. | 178/18 |
| 5,748,904 A | * | 5/1998 | Huang et al. | 707/6 |
| 6,026,082 A | * | 2/2000 | Astrin | 370/336 |
| 6,038,347 A | * | 3/2000 | Arakage et al. | 382/245 |
| 6,246,349 B1 | * | 6/2001 | Malik et al. | 341/106 |

* cited by examiner

Primary Examiner—Frantz Coby
(74) Attorney, Agent, or Firm—Sawyer Law Group LLP; Leslie VanLeeuwen (57) ABSTRACT

A system and method for compressing data on a computer system is disclosed. The method and system include separating the data into a plurality of segments. The plurality of segments includes a plurality of unique segments. The method and system also include providing a plurality of code words. Each of the plurality of code words corresponds to a unique segment of the plurality of unique segments. The method and system also include providing a representation of the data. The representation includes the plurality of code words for the plurality of segments. The plurality of code words in the representation replaces the plurality of segments. As a result, the data in the representation could be accessed randomly.

20 Claims, 4 Drawing Sheets

METHOD AND SYSTEM FOR COMPRESSING DATA WHICH ALLOWS ACCESS TO DATA WITHOUT FULL UNCOMPRESSION

CROSS-REFERENCE TO RELATED APPLICATIONS

The present invention is related to co-pending United States Patent Application entitled "METHOD AND SYSTEM FOR COMPRESSING A STATE TABLE THAT ALLOWS USE OF THE STATE TABLE WITHOUT FULL UNCOMPRESSION", Ser. No. 09/210,091, filed on Jun. 12, 2001 now U.S. Pat. No. 6,246,349 and assigned to the assignee of the present application.

FIELD OF THE INVENTION

The present invention relates to computer systems and more particularly to a method and system for data compression which provides the ability to use compressed data without completely decompressing the file.

BACKGROUND OF THE INVENTION

Data compression is useful in a wide variety of computing applications and computer systems. In general, data compression is useful any time more information is desired to be stored in a given amount of memory. For example, many applications are run on systems having a reduced amount of memory. Personal digital assistants (PDAs) and processors in automobiles are systems having limited memory. It is also desirable to provide more functionality on systems having limited memory. In some cases, the amount of memory in such systems could limit the systems' utility. In order to store more information on a given amount of memory, the data is compressed. Thus, data compression allows additional data to be stored on systems having limited memory.

Other systems or applications may store a large amount of data. For example, a large corporation may store data relating to customers and vendors. The computer system may be used for a variety of other applications. Thus, there may be a large amount of important information residing on the computer system. Simulations resulting in a large amount of stored data may also be run on a computer system. Storage of large data files or a large number of data files reduces the amount of space available for other information. Data compression allows for more information important to the users of the system to be stored. Similarly, individual users may wish to retain more information on the storage of their home computer. Data compression allows the user to store more information on a storage media. Furthermore, many individuals today access files via private networks or public networks, such as the Internet. Large files take a longer time to download. If data in the file is compressed, the time to download the file is reduced. Consequently, data compression is useful in applications that are as pervasive as they are varied.

Conventional data compression utilizes a dictionary. As a source data file is read, unique patterns of bits are searched for and a dictionary generated. The dictionary associates a unique pattern of bits with a code word. If the current bits being read do not match a pattern, then the bits are resaved in the order of the source data file. However, if a pattern recurs, then a code word replaces the pattern. Typically, the code word may point to a previous occurrence of the pattern. However, the code word could also point to the entry in the dictionary corresponding to the code word. Thus, a conventional compressed file is generated. Where there are recurring patterns of bits in the source data file, the conventional compressed file and the dictionary occupy less space than the source data file.

Although conventional data compression allows the conventional compressed file to occupy less memory than the source data file, this is only true while the conventional compressed file is stored. Many applications randomly access data being used. Thus, if the conventional compressed file is to be used, the conventional compressed file must be completely uncompressed. The uncompressed file occupies the same amount of space as the source data file. If the entire conventional compressed file is uncompressed and stored in memory, then memory is consumed. The conventional compressed file may be uncompressed on the fly. However, the uncompressed data can only be accessed sequentially. Thus, the application using the uncompressed data file must use data sequentially or uncompress the conventional compressed file multiple times. Thus, the applications which can be used are limited or processor resources are consumed.

Accordingly, what is needed is a system and method for providing data compression which allows the data to be utilized without full uncompression of the entire compressed file. The present invention addresses such a need.

SUMMARY OF THE INVENTION

The present invention provides a method and system for compressing data on a computer system. The method and system comprise separating the data into a plurality of segments. The plurality of segments include a plurality of unique segments. The method and system also comprise providing a plurality of code words. Each of the plurality of code words corresponds to a unique segment of the plurality of unique segments. The method and system also comprise providing a representation of the data. The representation includes the plurality of code words. The plurality of code words in the representation replaces the plurality of segments.

According to the system and method disclosed herein, the present invention allows compressed data to be used without full uncompression, thereby increasing the ability of the system to use the data with a given amount of memory.

DETAILED DESCRIPTION OF THE INVENTION

The present invention relates to an improvement in data compression. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

Figure 1:
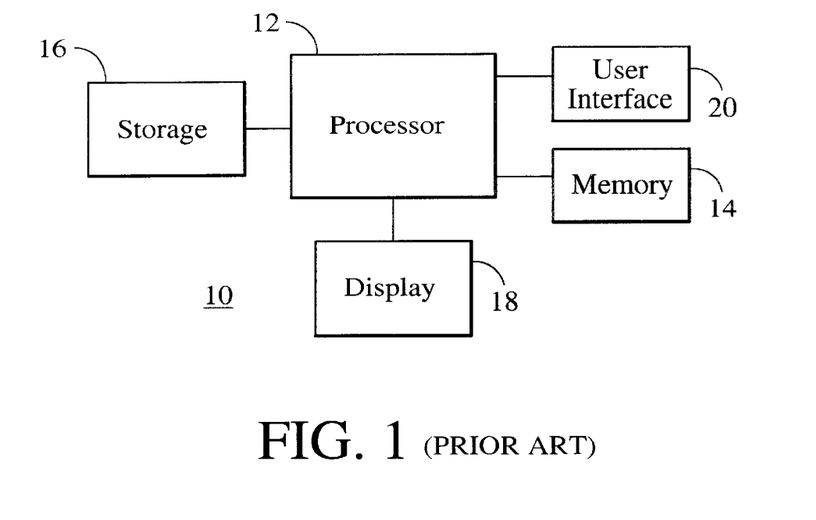
FIG. 1 is a block diagram of a computer system.

FIG. 1 is a block diagram of one computer system 10. The computer includes a processor 12, memory 14, storage 16, a display 18, and a user interface 20. The storage 14 may include a variety of devices, such as a hard disk or a removable storage medium including as a floppy disk or tape. The user interface 20 typically includes a mouse, a keyboard or other devices (not shown). Although the computer system 10 is depicted, another computer system could be very different. For example, the computer system could be connected to a private or public network, could include other or different components, or be used in a variety of applications, such as those discussed above.

The processor 12 is used to run applications (not shown) which may be stored on the memory 14. During use, data may also be stored on the memory 14. However, for long term storage, data is typically stored on the storage 16. For many reasons, data stored, used by, or provided to the computer system 10 is desired to be compressed.

Figure 2:
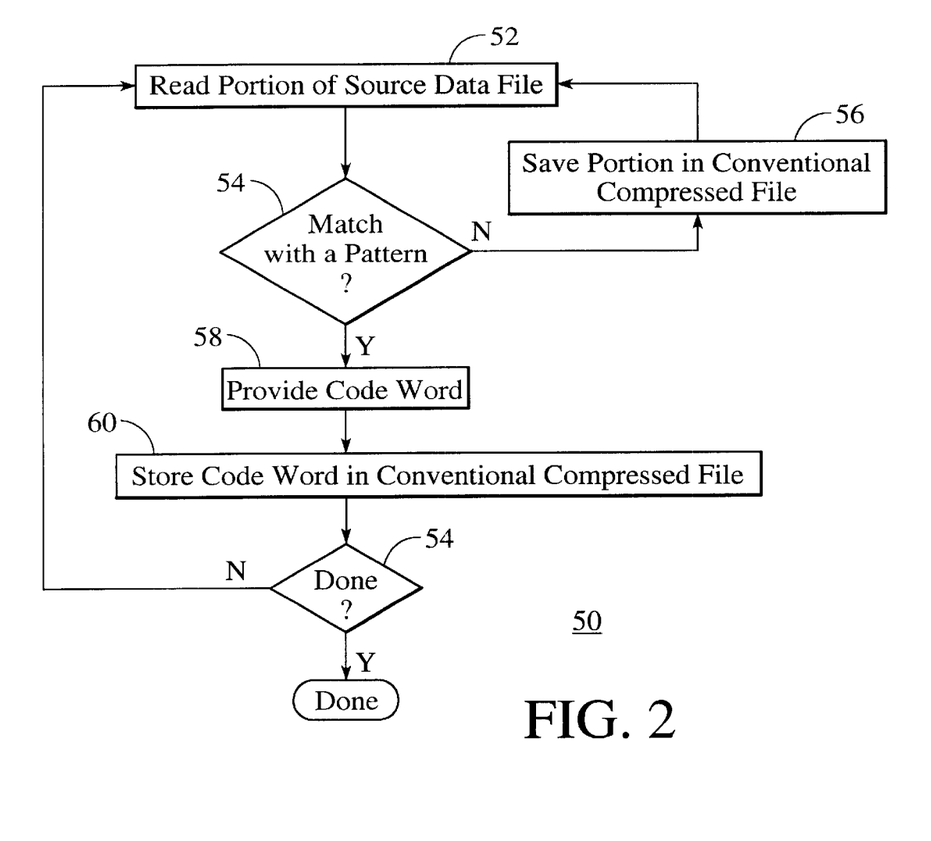
FIG. 2 is a flow chart depicting a conventional method for compressing data.

FIG. 2 depicts a conventional method 50 for compressing a source data file (not shown). A portion of the source data file is read, via step 52. It is then determined if the portion of the source data file being read matches a pattern from the source data file, via step 54. The pattern from the source data file is from some previously read portion of the source data file. Thus, step 54 determines whether there is a recurring pattern of bits in the source data file.

If the portion of the source data file being read does not match any pattern, then the portion is stored in the compressed file, via step 56. Step 62, discussed below, is then jumped to. If the portion being read matches a pattern, then via step 58 a code word is provided. The code word corresponds to the pattern which the portion of the source data file matches. Typically, the code word provided in step 58 points to a previous occurrence of the pattern. The code word is then stored in the conventional compressed file in place of the portion of the source data file, via step 60. It is then determined if the source data file has been completely read, via step 62. Step 62 might include determining whether the portion just read includes the end of the source data file. If not, then step 52 is returned to and a next portion of the source data file is read. Thus, the source data file is serially read and compressed using the method 50. The steps 54 through 62 may then be repeated. If the source data file has been completely read, then the method terminates, via step 64.

Thus, a conventional compressed file has been generated. The conventional compressed file typically contains information in the same order as the source data file. Portions of the conventional source data file which are not repeated are typically stored as is in the conventional compressed file. However, in place of repeated patterns of bits, the conventional compressed file contains code words.

Once the source data file has been compressed using the conventional method 50, the conventional compressed file can be stored, for example on the storage 16. The conventional compressed file will occupy less space on the storage 16 than the source data file.

Although the conventional method 50 for decompressing a data file functions those with ordinary skill in the art will realize that the conventional compressed file is uncompressed completely for use. Without sequentially accessing data in the conventional compressed file, there is little indication as to what a portion of the source data file a particular portion of the compressed file corresponds. This is particularly true when the recurring patterns may have varying length. Thus, an application using the compressed data file would typically be unable to determine the location of a desired item of data in the source data file without uncompressing the entire conventional compressed file. This is particularly true because application typically randomly access data in files which are being used by the application.

For example, suppose the application is a database engine and the source data file includes information for the database. Typically, a particular piece of data within the database should be able to be accessed randomly. Thus, a user should be able to access information about any entry in the database through the application. However, the conventional compressed file does not indicate which portion of the compressed data corresponds to a particular portion of the source data file. There is no guarantee that if the application decompresses a portion of the conventional compressed data file that the portion will correspond to the desired portion of the source data file. Furthermore, if the code word in the portion of conventional compressed file points back to a prior occurrence of the pattern which the code word represents, the portion of the conventional compressed file may not be able to be adequately uncompressed on its own. Thus, the whole conventional compressed file is uncompressed for use.

When the conventional compressed file is uncompressed for use, the uncompressed file is typically stored in the memory 14. The uncompressed file occupies the same amount of space as the source data file. Thus, the uncompressed file consumes a large amount of the memory 14. If the uncompressed file is large enough, the computer system 10 may be incapable of running the application with the entire uncompressed file. The computer system 10 may also uncompress the conventional compressed file on the fly, without storing the entire uncompressed file in the memory 14. However, if the application requires repeated access to the data, the conventional compressed file may need to be uncompressed repeatedly. This slows the performance of the computer system 10.

The present invention provides a method and system for compressing data on a computer system. The method and system comprise separating the data into a plurality of segment. The plurality of segments include a plurality of unique segments. The method and system also comprise providing a plurality of code words. Each of the plurality of code words corresponds to a unique segment of the plurality of unique segments. The method and system also comprise providing a representation of the data. The representation includes the plurality of code words, wherein the plurality of code words replaces the plurality of segments.

The present invention will be described in terms of a particular computer system and particular applications. However, one of ordinary skill in the art will readily recognize that this method and system will operate effectively for other types of computer systems and other applications. Generally, the present invention is useful in any context where data compression is desirable. Moreover, the present invention will be discussed in the context of segments, subsegments, and data having particular lengths. However, one of ordinary skill in the art will readily realize that the present invention is consistent with segments, subsegments, and data having different lengths.

Figure 3:
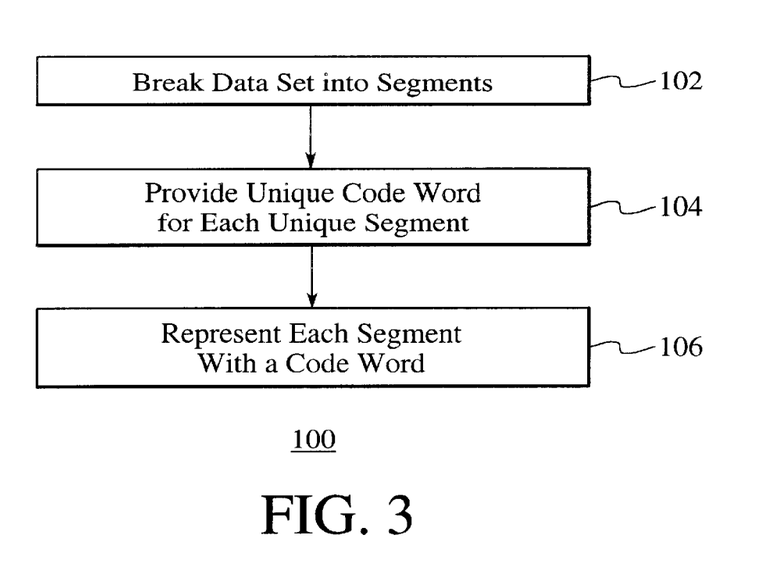
FIG. 3 is a high level flow chart depicting a method in accordance with the present invention for compressing data.

To more particularly illustrate the method and system in accordance with the present invention, refer now to FIG. 3 depicting a high level flow chart of one embodiment of a method 100 in accordance with the present invention. The method 100 may be used in conjunction with a computer system, such as the computer system 10. The method 100 compresses a data set. The data set is broken into segments, via step 102. In a preferred embodiment, each segment has the same length. A unique code word is generated for each unique segment of the segments, via step 104. As more code words are generated, the length of each code word may increase when all combinations for a particular length code word have been used. In a preferred embodiment, the length of each code word is increased by a small integral number of bits, for example four bits, each time longer code words become needed. Also in a preferred embodiment, step 104 includes generating a dictionary indicating the correspondence between each unique code word and the unique segment it represents. A representation for each of the segments is provided, via step 106. In a preferred embodiment, step 106 includes generating a compressed file by providing a code word corresponding to each of the segments. In a preferred embodiment, the code words are provided in the order of the segments. Thus, the first segment is represented in the compressed file by a first code word. The second segment is represented in the compressed file by a second code word. However, if the second segment is the same as the first segment, then the second code word and the first code word are the same.

The method 100 can be applied hierarchically. Thus, the data set compressed in the method 100 may be an entire file, or a portion of the entire file. For example, the data set could be one of a number of super-segments. The super-segments could make up the entire data file or a portion of the data file. To use the method 100 hierarchically, step 102 would be repeated until the lowest level in the hierarchy is reached. Steps 104 through 106 may be performed for the lowest level of the hierarchy having the shortest segment length. Segments in higher levels of the hierarchy can be represented by code words based on the pattern code words from the next lower level in each segment. Because the method 100 can be performed hierarchically and because there is a greater probability of similarity between bits of smaller widths of a segment, the size of the dictionary may be kept small.

Figure 4:
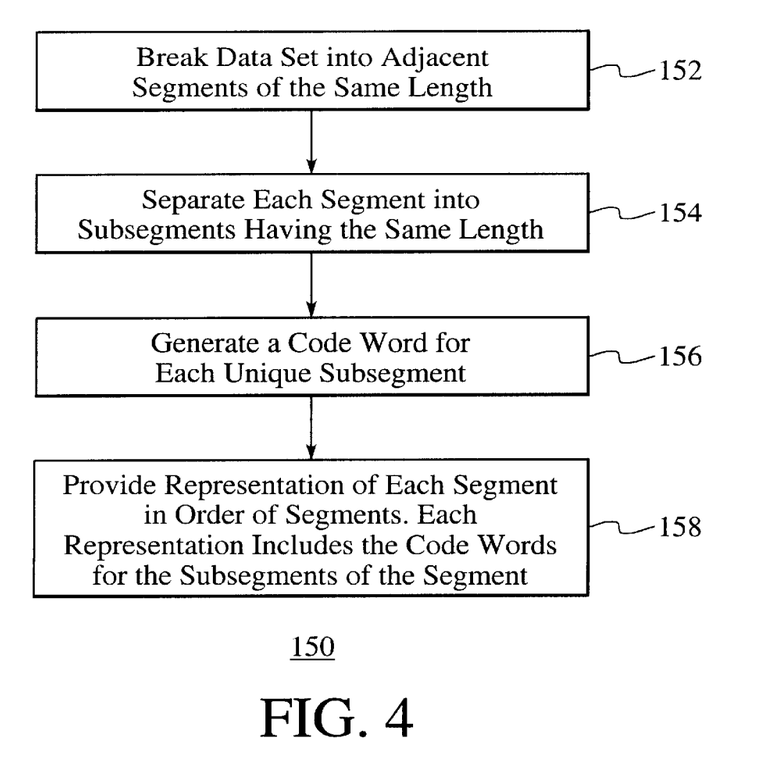
FIG. 4 is a more detailed flow chart of a method in accordance with the present invention for compressing data.

FIG. 4 depicts a more detailed flow chart of a method 150 for compressing data in accordance with the present invention. The method 150 is an example of how the method 100 can be used hierarchically in a two level hierarchy. The method 150 is also used in conjunction with a computer system, such as the computer system. A data set is broken into adjacent segments, via step 152. In a preferred embodiment, the segments have the same length. Each segment is separated into adjacent subsegments, via step 154. In a preferred embodiment, each subsegment has the same length.

A code word is generated for each unique subsegment, via step 156. In a preferred embodiment, step 154 includes generating a dictionary indicating the correspondence between each unique code word and the unique segment it represents. As more code words are generated, the length of each code word may increase when all combinations for a particular length code word have been used. In a preferred embodiment, the length of all code words is increased by a small integral number of bits each time longer code words become needed.

A representation of each segment is provided in a compressed file, via step 158. In a preferred embodiment, the representations for the segments are stored in the order in which the segments appeared. The representation of each segment preferably includes the code words for each subsegment in the segment. In a preferred embodiment, the representation of each segment includes the code word for each of the subsegments in the order each subsegment appeared. In another embodiment, step 158 could include providing a second dictionary. The second dictionary would indicate a correspondence between and index for a segment and the code words representing the subsegments in that segment. The index could be provided for each unique segment or for each segment. The compressed file would then include the indices in place of the segments.

Figure 5:
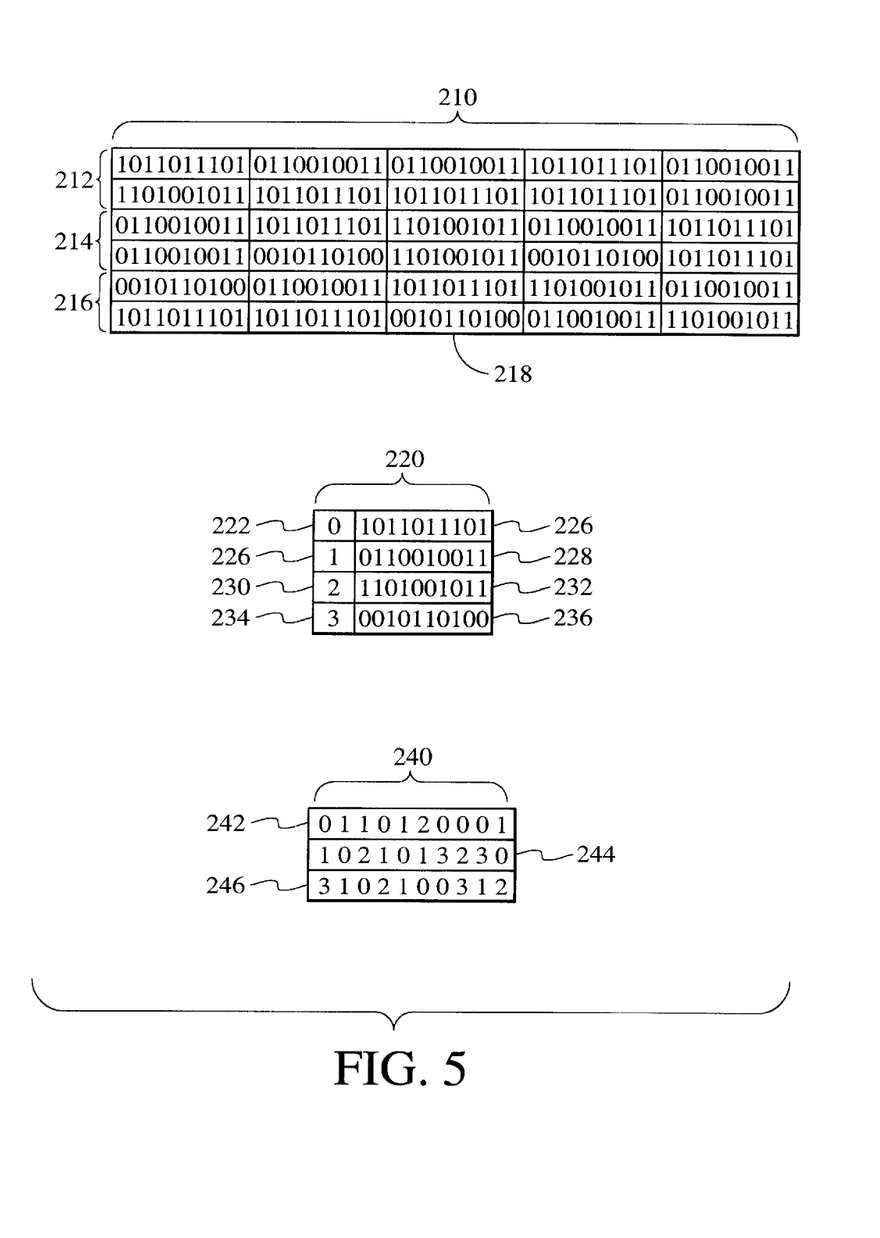
FIG. 5 is a diagram depicting a correspondence between a source data file, a compressed file in accordance with the present invention, and a dictionary in accordance with the present invention.

To more particularly explain the methods 100 and 150, refer to FIG. 5. FIG. 5 depicts the source data file 210, the dictionary 220, and the compressed file 240. There are two levels in the hierarchy for the source data file 210, dictionary 220 and compressed file 240 shown in FIG. 5. The source data file 210 has been separated into three segments 212, 214, and 216. Each segment 212, 214, and 216 includes ten subsegments 218. Each subsegment is ten bits long. The use of subsegments, which are shorter than the segments, makes it more likely that a pattern found in one of the subsegments 218 will be found in another of the subsegments 218.

The dictionary 220 indicates the relationship between the unique code words 222, 226, 230, and 234, and the corresponding unique subsegment 224, 228, 232, and 236, respectively. The dictionary 220 is, therefore, a dynamically growable hash table. The table grows as subsegments 18 having new patterns are read. The hash indices are the code words 222, 226, 230, and 234. As depicted in FIG. 5, although the source data file 210 includes three hundred bits, there are only four unique subsegments 218. Therefore, only four code words 222, 226, 230, and 234 are used. Note that although the code words 222, 226, 230, and 234 are represented in base ten in FIG. 5, each code word is two bits long. Thus, the dictionary 220 includes code words 222, 226, 230, and 234 each having the same length, two bits. Each code word 222, 226, 230, and 234 represents a unique subsegment 222, 226, 230, or 234 that are all ten bits in length.

In a preferred embodiment, the dictionary 220 is stored in the memory 14 of the system depicted in FIG. 1. However, if the dictionary 220 is large in size, the dictionary 220 may be stored elsewhere. For example, the dictionary 220 may reside on the storage 16. However, the code words 222, 226, 230, and 230 and the unique subsegments 224, 228, 232, and 236 may be accessed randomly when the dictionary is ordered by the code words (hash index) 222, 226, 228, and 230.

The compressed file 240 includes a string of bits representing each of the segments 212, 214, and 216 of the source data file 210. The bits are the code words for each subsegment 218. As depicted in FIG. 5, the bits represent the numbers zero through three, indicating the code words 222, 226, 230, and 324. Thus, using the terminology of a hash table, the hash index stored in the compressed file 240 replaces the actual data.

For ease of understanding, the compressed file 240 is shown as having three sections 242, 244, and 246 corresponding to the segments 212, 214, and 216 of the source data file 210. Each section includes ten numbers for each code word 222, 226, 230, or 234 representing a subsegment 218. Four code words are needed to represent the source data file 210 and each code word is two bits long. Thus, the compressed file is only sixty bits in length, while the source data file is three hundred bits long. In general, where z is the number of bits in the code word, and N is the number of bits in the source data file 210, the compression ratio is on the order of N/z. In general, if a data set, such as the source data file 210, that is N bits in length is divided into p segments having width w, and N/p is kept much greater than the $\log_2$(number of patterns of width 2) then data is compressed on the order of (N/p)*[1/$\log_2$(number of patterns of width 2)] for the dictionary 220.

Thus, data set can be compressed via the method 100 or 150 into a compressed file 240 which includes a code word for each segment or subsegment in the data set. The compressed file 240 occupies a much smaller portion of space in the memory 14 or the storage 16 than the source data file 210. When the compressed file is used, only a portion of the compressed data that is of interest need be uncompressed.

Figure 6:
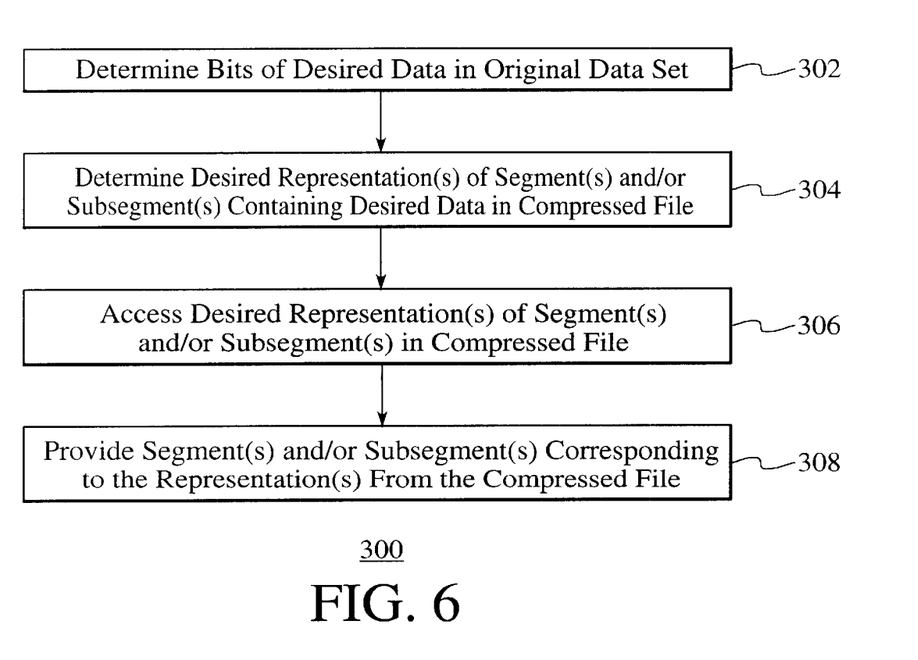
FIG. 6 is a flow chart depicting a method for using data compressed in accordance with the present invention.

To more particularly illustrate the use of a compressed file 240, refer to FIG. 6. FIG. 6 depicts a method 300 for using a portion of compressed file 240. The bits in the source data file 210 which are the desired data are determined, via step 302. The portion(s) of the compressed file 240 including the code word(s) corresponding to the desired data are then determined, via step 304. Step 304 is relatively simple to perform because a particular number of bits in the source data file 210 correspond to a certain number of bits in the compressed file 240.

The appropriate portion(s) of the compressed file are then accessed, via step 306. Thus, the code words corresponding in the compressed file 240 corresponding to the desired data are accessed in step 306. The corresponding unique subsegments 224, 228, 232, and 236 are then provided for each code word in the portion of the compressed file, via step 308. Step 308 includes accessing the dictionary 220 for each code word in the appropriate portion of the compressed file and providing the unique segment or subsegment corresponding to each code word.

For example, suppose bits thirty through forty-eight are determined to be of interest in step 302. Each code word 222, 226, 230, and 234 in FIG. 5 is two bits long and corresponds to a unique subsegment 224, 228, 232, and 236, respectively, that is ten bits long. If bits thirty through forty-eight are of interest in the source data file 210, bits six through nine are of interest in the compressed file 240. Consequently, it is determined in step 304 that bits six through nine, representing code words zero 222 and one 226, in the compressed file 240 should be accessed. Bits six through nine are then accessed, via step 306. Using this information, the unique segments 224 and 228 are provided from the dictionary 220 in step 308.

Thus, data in the compressed file 240 can be accessed in non-sequential order. Because of this, the entire compressed file 240 need not be uncompressed in order for an application to use a portion of the compressed file 240. Instead, a portion of the compressed data file 240 may be uncompressed at a particular time. Thus, the memory 14 is not needlessly consumed when the uncompressed file 240 is used. As a result, larger data sets can be run with a given amount of memory 14. For example, data which may need to be split into multiple tables to be used if fully uncompressed can be used. Even compressed files that would occupy gigabytes of space when completely uncompressed, can be used by applications. Furthermore, higher performance of the application may be achieved. Because the compressed file 240 is smaller than the source data file 210, less paging, fewer cache (not shown) misses, and fewer other drawbacks due to the size of the source data file 210 result. Note that the compressed file 240 can still be uncompressed in its entirety or uncompressed on the fly if desired.

Thus, the present invention provides a method and system for compressing data. As a result, the present invention is useful in applications which would have used conventional data compressed. As discussed above, the compressed file 240 can be used without uncompressing the whole compressed file 240. Thus, the present invention overcomes many of the drawbacks of the conventional data compression method 50. Consequently, the present invention is useful for applications with which the conventional data compression method 50 is not be utilized. For example, the present invention is useful for applications which utilize data files too large to be adequately stored in memory the 14.

One such application is the all events trace (AET). The AET file can be compressed using the method 100 or 150 and uncompressed using the method 300. An AET is used to test digital logic through simulation. An AET is a cycle by cycle trace of nets that is taken during a simulation. There may be hundreds of thousands of nets in the logic being tested. The simulation can also run for hundreds of thousands of cycles. A cycle may consume over a megabyte in length. Consequently, the AET file can be many gigabytes in size. Viewing or using such a file on a cycle by cycle basis so far is impracticable because typical AET file is large enough to be difficult or impossible to fit in the memory 14 for random access.

The AET file includes a table of rows of bit values for each simulation cycle. Each row corresponds to a simulation cycle. Each column represents particular net. A bit value in an entry corresponds to the logic state that a particular net has during the corresponding cycle. Because the AET includes a table, an entry for a particular net is at a fixed offset from the start of a row.

Figure 7:
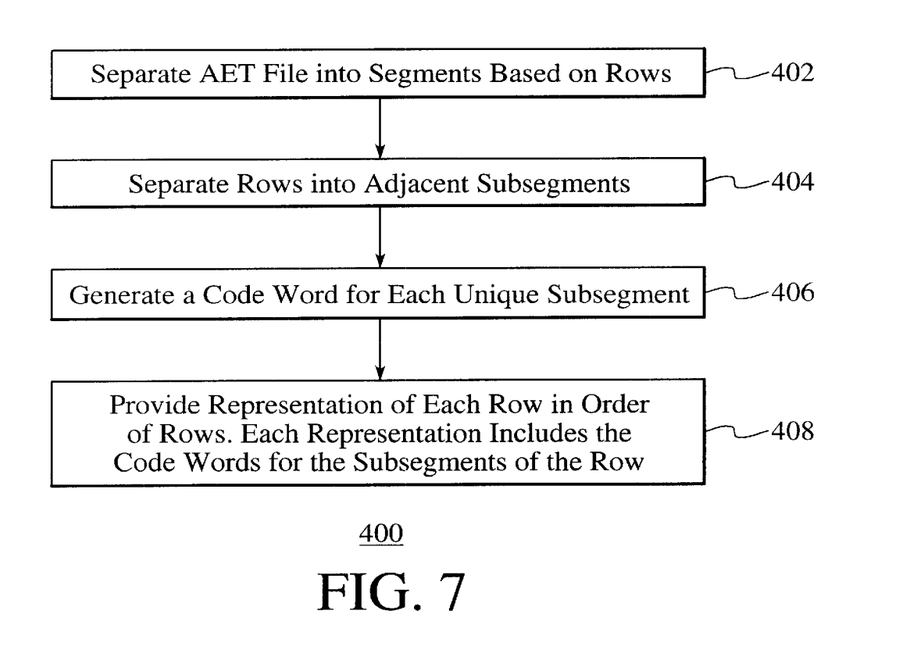
FIG. 7 is a more detailed flow chart of a method in accordance with the present invention for compressing an all events trace file.

The AET file can be used the data set for the method 100 or the method 150. FIG. 7 depicts one embodiment of a method 400 in accordance with the present invention for compressing an AET file. The rows of the table in the AET file have the same length. Thus, each row of the table in the AET file has is separated into a separate segment of a fixed length, via step 402. Each row is then divided into adjacent subsegments, via step 404. The subsegments have the same length. A unique code word for each unique subsegment is generated, via step 406. Step 406 includes providing a dictionary indicating the correspondence between the unique subsegments and the code words. A representation for each row is then saved in a compressed AET file, via step 408. In step 408, the representations for the rows are stored in the order of the rows. The representation of each row includes code words representing each subsegment in the order the subsegments occurred in the row.

Thus, the AET file is compressed to form a compressed AET file. Portions of the compressed AET file can be accessed in a random fashion using the method 300 depicted in FIG. 6. Thus, the portions of the compressed AET that are uncompressed for use can fit into the memory 14. As a result, the AET file can be viewed on a cycle by cycle basis.

A method and system has been disclosed for compressing data in a manner that allows the data to be used without complete decompression. Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for compressing and accessing data on a computer system, the method comprising the steps of:
    (a) separating the data into a plurality of segments, the plurality of segments including a plurality of unique segments;
    (b) providing a plurality of code words, each of the plurality of code words corresponding to a unique segment of the plurality of unique segments;
    (c) providing a representation of the data the representation including the plurality of code words;
        wherein the plurality of code words replace the plurality of segments; and
    (d) decompressing a only portion of the representation of the data to allow a user access to a desired data set, the portion of the representation of the data including only a portion of the plurality of code words corresponding to at least one segment including the desired data set.

2. The method of claim 1 wherein the plurality of segments have an order and wherein the representation providing step (c) further includes the step of:
    (c1) saving the code word for each of the plurality of segments in the order.

3. The method of claim 1 wherein the data includes a data file.

4. The method of claim 1 wherein the plurality of segments have a fixed length.

5. The method of claim 1 wherein the data includes a portion of a data file.

6. The method of claim 1 wherein the code word representing a particular segment of the plurality of segments can be randomly accessed.

7. The method of claim 1 wherein a portion of the representation of the data can be used without completely uncompressing the representation of the data.

8. The method of claim 1 further wherein the plurality of code word providing step further includes the step of:
    (b1) providing a dictionary indicating a correspondence between the plurality of code words and the plurality of unique segments.

9. A method for compressing data on a computer system, the data including a portion of a data file, the data file being divided into a plurality of super-segments, the portion of the data file further including a super-segment of the plurality of super-segments, the method comprising the steps of:
    (a) separating the data into a plurality of segments, the plurality of segments including a plurality of unique segments;
    (b) providing a plurality of code words, each of the plurality of code words corresponding to a unique segment of the plurality of unique segments;
    (c) providing a representation of the data, the representation including the plurality of code words;
        wherein the plurality of code words replace the plurality of segments; and
    (d) decompressing a only portion of the representation of the data to allow a user access to a desired data set the portion to the representation of the data including only a portion of the plurality of code words corresponding to at least one segment including the desired data set.

10. A method for compressing data on a computer system, the method comprising the steps of:
    (a) separating the data into a plurality of segments, the plurality of segments being adjacent;
    (b) separating each of the plurality of segments into a plurality of subsegments, the plurality of subsegments being adjacent;
    (c) providing a plurality of code words, each of the plurality of code words corresponding to a unique subsegment of the plurality of unique subsegments;
    (d) providing compressed data including a representation of each segment, the representation including a portion of the plurality of code words;
        wherein the portion of the plurality of code words replaces the plurality of subsegments in each of the plurality of segments, the representation of a particular segment being saved before a subsequent representation of a subsequent segment of the plurality of segments;
        wherein a portion of the data represented by a portion of the compressed data may be accessed without uncompressing all of the compressed data.

11. A computer system for compressing data and accessing the data, comprising;
    a processor;
    a memory coupled with the processor;
    means coupled with the processor for compressing data including
        means for separating the data into a plurality of segments, the plurality of segments including a plurality of unique segments;
        means coupled with the separating means for providing a plurality of code words, each of the plurality of code words corresponding to a unique segment of the plurality of unique segments; and
        means, coupled with the plurality of code word providing means, for providing a representation of the data, the representation including the plurality of code words; and
        means for decompressing a only portion of the representation of the data to allow a user access to a desired data set, the portion of the representation of the data including only a portion of the plurality of code words corresponding to at least one segment including the desired data set;
        wherein the plurality of code words replace the plurality of segments.

12. The system of claim 11 wherein the plurality of segments have an order and wherein the representation providing means further includes:
    means for saving the code word for each of the plurality of segments in the order.

13. The system of claim 11 wherein the data includes a data file.

14. The system of claim 11 wherein the data includes a portion of a data file.

15. The system of claim 11 wherein the code word representing a particular segment of the plurality of segments can be randomly accessed.

16. The system of claim 11 wherein the plurality of code word providing means further include:
    means for providing a dictionary indicating a correspondence between the plurality of code words and the plurality of unique code words.

17. The system of claim 11 wherein a portion of the representation of the data can be used without completely uncompressing the representation of the data.

18. A system for compressing data on a computer system, the data including a portion of a data file, the data file being divided into a plurality of super-segments, and the portion of the data file further including a super-segment of the plurality of super-segments, the system comprising:

a processor;

a memory coupled with the processor; and means coupled with the processor for compressing data including         means for separating the data into a plurality of segments, the plurality of segments including a plurality of unique segments;

means coupled with the separating means for providing a plurality of code words, each of the plurality of code words corresponding to a unique segment of the plurality of unique segments;

means, coupled with the plurality of code word providing means, for providing a representation of the data, the representation including the plurality of code words;

wherein the plurality of code words replace the plurality of segments; and     (d) means for decompressing a only portion of the representation of the data to allow a user access to a desired data set, the portion of the representation of the data including only a portion of the plurality of code words corresponding to at least one segment including the desired data set.

19. A computer-readable medium including a program for compressing accessing data on a computer system, the program including instructions for:

(a) separating the data into a plurality of segments, the plurality of segments including a plurality of unique segments;

(b) providing a plurality of code words, each of the plurality of code words corresponding to a unique segment of the plurality of unique segments; and     (c) providing a representation of the data, the representation including the plurality of code words;

(d) decompressing a only portion of the representation of the data to allow a user access to a desired data set, the portion of the representation of the data including only a portion of the plurality of code words corresponding to at least one segment including the desired data set;

wherein the plurality of code words replace the plurality of segments.

20. A computer-readable medium containing a program for compressing data on a computer system, the program including instructions for:

(a) separating the data into a plurality of segments, the plurality of segments being adjacent;

(b) separating each of the plurality of segments into a plurality of subsegments, the plurality of subsegments being adjacent;

(c) providing a plurality of code words, each of the plurality of code words corresponding to a unique subsegment of the plurality of unique subsegments;

(d) providing compressed data including a representation of each of the plurality of segments, the representation including a portion of the plurality of code words;

wherein the portion of the plurality code words replace the plurality of subsegments of each of the plurality of segments;

wherein a portion of the data represented by a portion of the compressed data may be accessed without uncompressing all of the compressed data.

\* \* \* \* \*